T. B. SITZLER.
INTERNAL COMBUSTION ENGINE.
APPLICATION FILED FEB. 21, 1912.

1,087,841.

Patented Feb. 17, 1914.
2 SHEETS—SHEET 1.

Witnesses
William Smith
V. B. Hillyard

Inventor
T. B. Sitzler
By Victor J. Evans
Attorney

T. B. SITZLER.
INTERNAL COMBUSTION ENGINE.
APPLICATION FILED FEB. 21, 1912.
1,087,841.
Patented Feb. 17, 1914.
2 SHEETS—SHEET 2.
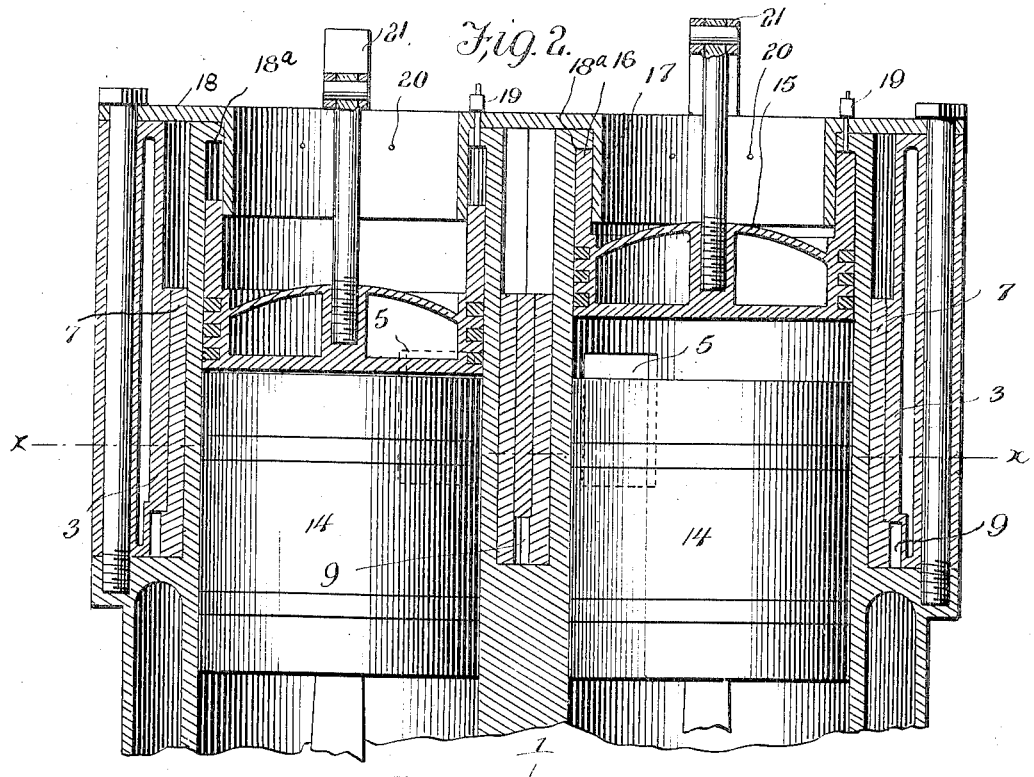
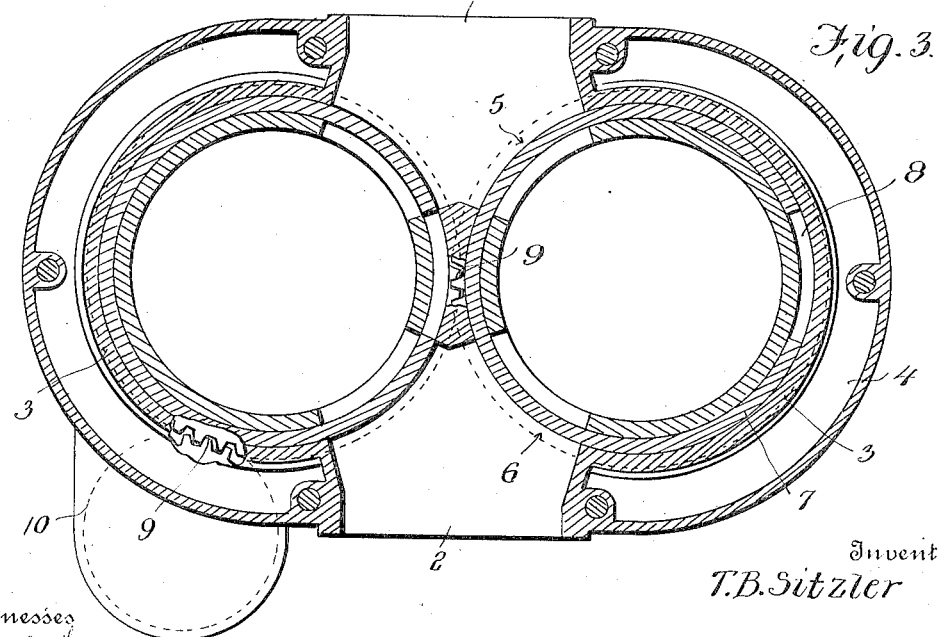
Witnesses
William Smith
U. B. Hillyard
Inventor
T. B. Sitzler
By Victor J. Evans
Attorney

UNITED STATES PATENT OFFICE.

THOMAS B. SITZLER, OF CAMDEN, NEW JERSEY.

INTERNAL-COMBUSTION ENGINE.

1,087,841.      Specification of Letters Patent.      Patented Feb. 17, 1914.

Application filed February 21, 1912. Serial No. 679,054.

*To all whom it may concern:*

Be it known that I, THOMAS B. SITZLER, a citizen of the United States, residing at Camden, in the county of Camden and State of New Jersey, have invented new and useful Improvements in Internal-Combustion Engines, of which the following is a specification.

My invention is designed to increase the efficiency of engines of the type hereinbefore designated, of the class embodying sleeve valves, or in which the gaseous mixture is confined solely in the cylinder.

The invention is primarily designed to get rid of the burnt gases after each explosion, so as to thoroughly scavenge the cylinder and prevent any of the gases mixing with the fresh charge on the next suction stroke of the engine, and to obtain a maximum expansion.

The invention also contemplates varying the space of the cylinder with reference to the stroke of the piston, with the result that the amount of the charge admitted into the cylinder at each stroke of the piston may be increased or diminished according to the result to be attained without altering the length of stroke of the piston.

The invention consists of a cylinder having a movable head so timed in its movements as to insure a complete scavenging of the cylinder and to vary the capacity thereof, whereby the expansion of the gases is utilized to obtain a greater percentage of power from a given charge of gaseous mixture under like conditions.

The invention also further consists of the novel features, details of construction and combination of said parts, which hereinafter will be more particularly set forth, illustrated in the accompanying drawings, and pointed out in the appended claims.

Figure 1:
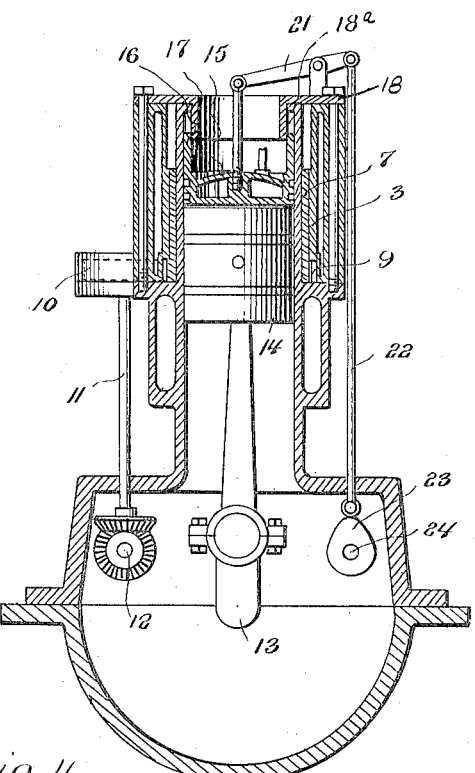
Figure 4:
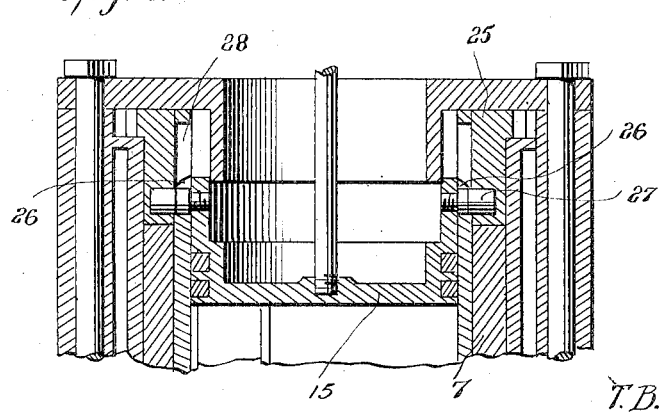

Referring to the drawings forming a part of the specification, Figure 1 is a vertical central transverse section of an internal combustion engine embodying the invention. Fig. 2 is a vertical central longitudinal section of a pair of cylinders and pistons showing the parts on a larger scale. Fig. 3 is a horizontal section on the line $x$—$x$ of Fig. 2. Fig. 4 is a sectional view of a modification.

Corresponding and like parts are referred to in the following description, and indicated in all the views of the drawings, by the same reference characters.

In accordance with this invention it is proposed to provide the cylinders in pairs as indicated more clearly in Figs. 1, 2 and 3, each pair of cylinders having an intake and an exhaust in common. Inasmuch as each cylinder, the piston arranged to operate therein and the concomitant parts are substantially the same, a detailed description of one only will suffice for a clear understanding of both.

The cylinders of each pair are cast in block, the latter having an intake 1 and an exhaust 2. The numeral 3 designates the cylinders which are surrounded by means of a jacket 4 through which a cooling medium is circulated, each cylinder having an intake 5 and an exhaust 6 which open respectively into the intake 1 and exhaust 2 of the block. A sleeve valve 7 encircles an end portion of the cylinder and is provided with a single opening 8 constituting a port which is adapted to register with the openings or ports 5 and 6 to control the admission of the gaseous mixture and the outflow of the burnt gases. The sleeve valve 7 has a rotary movement imparted thereto which is so timed as to cause the ports to register to admit the gaseous mixture at the proper time and to provide an escape for the exhaust at the right moment. As shown the lower end of the sleeve valve has a series of cog teeth 9, both sleeve valves intermeshing as indicated more clearly in Figs. 2 and 3 and one of the sleeve valves having its toothed portion 9 in mesh with a gear wheel 10 secured to one end of the shaft 11 which is geared at its lower end to a shaft 12 arranged to be driven from the crank shaft 13 in the usual manner.

The piston 14 may be of ordinary construction and is arranged to reciprocate in the cylinder and is connected to the crank shaft in the customary way. In accordance with this invention, the upper end of the cylinder is open and is closed by means of a movable head 15 whose movements are controlled in a determinate manner according to the result to be obtained. The movable head 15 has an outstanding flange 16 which obtains a close fit against the inner wall of the cylinder and which underlaps a flange 17 pendent from a cap plate 18 which is bolted or otherwise secured to the upper end of the block or cylinder. The pendent flange 17 protects the upper portion of the cylinder and prevents any dust or foreign matter from coming in contact therewith. The space 18ᵃ inclosed between the upper portion of the cylinder and the pendent flange 17 may be utilized for cushioning the head 15 upon its upstroke. A check valve 19 admits air into the space 18ᵃ upon the down stroke of the head 15 and closes upon the up stroke of said head so as to confine the air in the space 18ᵃ. Minute openings 20 are formed in the flange 17 and provide an escape for the air confined in the space 18ᵃ upon the up-stroke of the head 15. When the piston is on the working stroke or is moving to compress the charge, the head 15 is at the limit of its upper or out-stroke. When the piston is on the suction stroke the head 15 may or may not be at the limit of its up-stroke. When the piston is moving on the stroke to expel the burnt gases, the head 15 may likewise move in opposition to the piston so that when the latter reaches the limit of its up-stroke, the head 15 reaches the limit of its down stroke so that the space between the opposing faces of the piston and the movable head is practically *nil* with the result that all the burnt gases have been expelled preliminary to the movement of the piston to draw in the next charge. The head 15 may remain at its lowest position during the entire suction stroke of the piston so that upon the initial compression stroke of the piston, the head 15 may be moved upward, thereby enlarging the space of the cylinder to obtain an increased maximum expansion of the gases when the piston is on the working stroke after the mixture has been ignited. It is observed that the construction is such as to admit of the head 15 being moved upwardly after the piston has reached the limit of its suction stroke, thereby drawing in an additional charge represented by the stroke of the movable head. It is also possible to admit of the head 15 following the movement of the piston when the latter is on its suction stroke, thereby decreasing the charge, it being understood that the head is permitted to follow the piston for a limited distance only and that upon the compression stroke of the piston the head 15 moves to the limit of its upward stroke, thereby providing an increased cylinder space for the expansion of the gases to obtain a greater percentage of power with an increased efficiency of engine structure.

The head 15 may be controlled in its movements in a variety of ways, two being illustrated. As shown most clearly in Fig. 1, a rocker 21 is connected at one end to a stem of the head 15 and its opposite end is connected to a rod 22 which is operated by means of a cam 23 on a shaft 24 arranged to be operated from the crank shaft 13 in the usual way. As indicated in Fig. 4 a band 25 encircles the upper end of the cylinder and is arranged to have rotary movement imparted thereto. This band 25 has a cam way 26 which receives the outer ends of pins or studs 27 projecting outwardly from the sides of the head 15 at diametrically opposite points, said pins or studs passing through vertical slots 28 formed in the sides of the cylinder 3.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what is claimed as new, is:—

1. In an internal combustion engine and in combination with the cylinder and piston arranged to reciprocate therein, a head movable within the cylinder to vary the effective capacity thereof and to act in conjunction with the piston to insure a thorough scavenging of the cylinder, said head having an outer annular projection, and a cap plate secured to the cylinder and having an inner annular projection to form an air space to receive the annular projection of the movable head to cushion the same.

2. In an internal combustion engine and in combination with the cylinder and piston arranged to reciprocate therein, a head movable within the cylinder to vary the effective capacity thereof and to act in conjunction with the piston to insure a thorough scavenging of the cylinder, said head having an outer annular projection, a cap plate secured to the cylinder and having an inner annular projection to form an air space to receive the annular projection of the movable head to cushion the same, and means for admitting the atmosphere in regulated quantity in said annular space.

3. In an internal combustion engine and in combination with the cylinder and piston arranged to reciprocate therein, a head movable within the cylinder to vary the effective capacity thereof and to act in conjunction with the piston to insure a thorough scavenging of the cyinder, said head having an outer annular projection, a cap plate secured to the cylinder and having an inner annular projection to form an air space to receive the annular projection of the movable head to cushion the same, and said annular projection of the cap plate having minute openings to provide a slow escape for the air confined in said annular space upon the outstroke of the movable head.

4. In an internal combustion engine and in combination with the cylinder and piston arranged to reciprocate therein, a head movable within the cylinder to vary the effective capacity thereof and to act in conjunction with the piston to insure a thorough scavenging of the cylinder, said head having an outer annular projection, a cap plate secured to the cylinder and having an inner annular projection to form an air space to receive the annular projection of the movable head to cushion the same, said annular projection of the cap plate having minute openings to provide a slow escape for the air confined in said annular space upon the outstroke of the movable head, and a check valve for regulating the admission of the atmosphere into said annular space upon the instroke of the movable head.

In testimony whereof I affix my signature in presence of two witnesses.

THOMAS B. SITZLER.

Witnesses:
V. B. HILLYARD,
BENNETT S. JONES.